United States Patent [19]
Spangler

[11] 3,962,615
[45] June 8, 1976

[54] MULTIPLE MODE VARIABLE SPEED MOTOR CONTROL CIRCUIT

[76] Inventor: Searle T. Spangler, 2 Florian Court, Westport, Conn. 06880

[22] Filed: Mar. 20, 1974

[21] Appl. No.: 452,711

[52] U.S. Cl. .............................. 318/305; 318/345
[51] Int. Cl.² ........................................ H02P 5/16
[58] Field of Search .......... 318/345, 305, 246, 443, 318/447, 424, 420, 444

[56] References Cited
UNITED STATES PATENTS

| | | | |
|---|---|---|---|
| 3,293,521 | 12/1966 | Vroonhoven | 318/281 |
| 3,422,330 | 1/1969 | Swanke | 318/305 |
| 3,436,634 | 4/1969 | Baldwin et al. | 318/305 X |
| 3,638,091 | 1/1972 | Hosokawa et al. | 318/484 |
| 3,641,410 | 2/1972 | Vogelsberg | 318/345 |
| 3,670,226 | 6/1972 | Mazza | 318/345 |
| 3,815,001 | 6/1974 | Jamieson | 318/305 X |
| 3,833,845 | 9/1974 | Smallbone et al. | 318/305 |

Primary Examiner—B. Dobeck
Attorney, Agent, or Firm—Joseph Levinson

[57] ABSTRACT

A multiple mode variable speed motor control circuit is provided having a master control switch for applying a source of AC potential to the circuit. A diode rectifies the source for applying a DC potential across a string of resistors from which a control voltage is selected by a plurality of push button switches having a common output which is connected to a motor control circuit including a silicon controlled rectifier (SCR). The SCR is coupled to and operates a motor in the conventional phase-control manner. A memory in the form of a capacitor is coupled to the input of the motor control circuit in one position of the master control switch, allowing the push button to be activated momentarily, with the memory maintaining the speed of the motor at the selected rate. In another position of the master control switch the push button corresponding to the motor speed selected must be continually actuated for running the motor at the selected speed. A timer circuit may also be provided which acts to de-activate the memory after a predetermined time interval to automatically stop the motor.

6 Claims, 1 Drawing Figure

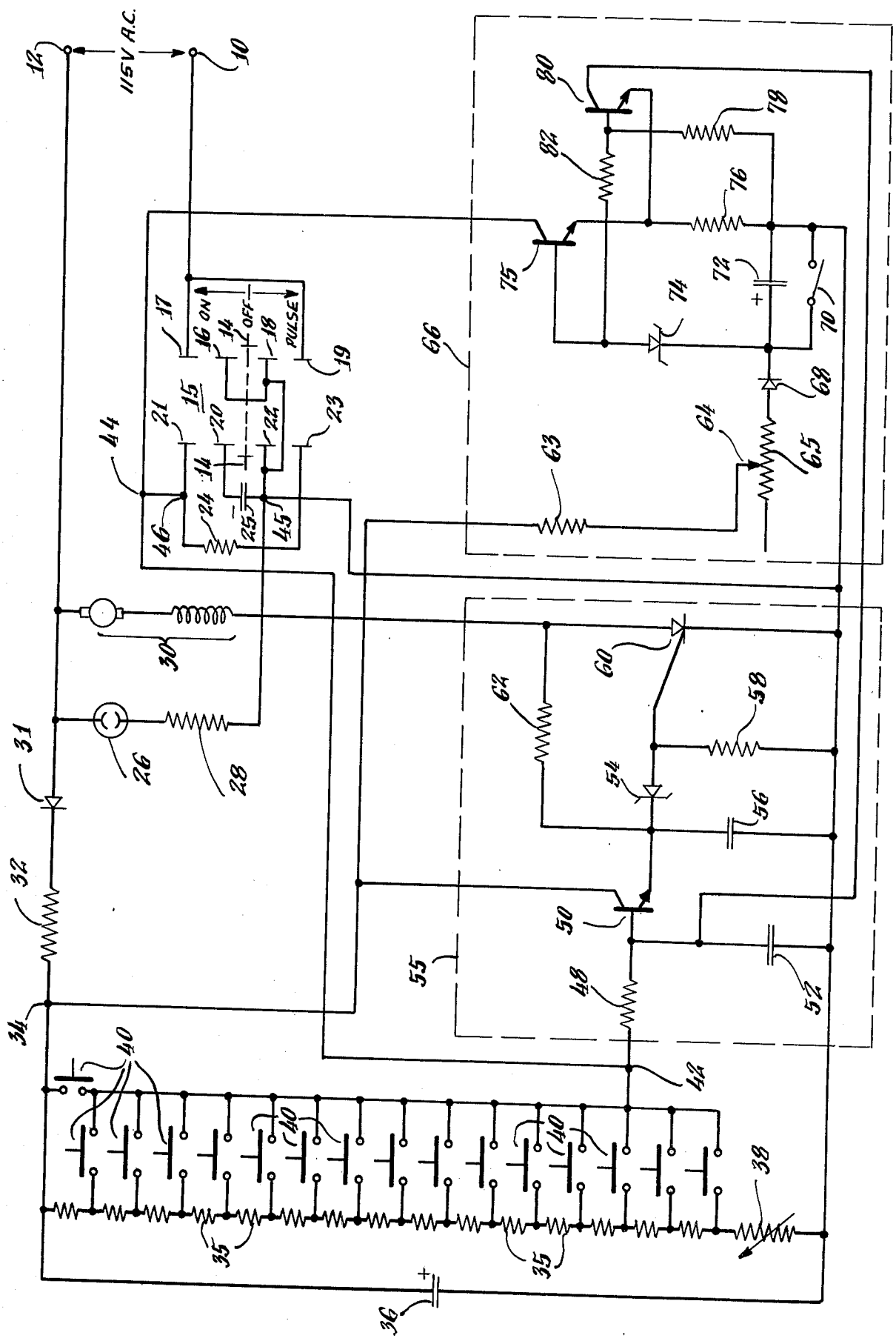

MULTIPLE MODE VARIABLE SPEED MOTOR CONTROL CIRCUIT

BACKGROUND OF THE INVENTION

This invention relates to a variable speed motor control circuit, and more particularly to a circuit of this type utilizing a plurality of push button switches which are actuated momentarily and released to provide the desired speed of the motor being controlled.

There are a number of applications for motor control circuits to control the speed of a motor with a selection which may be as many as 15 or even more speeds, varying from very slow to very fast, for example, kitchen blenders, mixers, as well as many others where a number of variable speeds are required. In many such applications, a plurality of push buttons are utilized which, when activated, remain in that position until a predetermined period of time as set by a timer or until the device is switched off. In order to change speeds in such an arrangement, another push button must be depressed, and some mechanical linkage must be provided for releasing the previously activated button, requiring somewhat complex switching and mechanical arrangements to achieve the variable speed function. It would be desirable to provide a variable speed motor control circuit where a plurality of speeds are provided in which the push buttons are required to be only momentarily depressed, eliminating the need for the force required to latch a push button down, and further eliminating the complex and expensive switching arrangements. It would also be desirable to operate a variable control circuit for an appliance such as a blender in a manner whereby the motor runs only at a speed selected when the button representing that speed is continuously depressed. It would also be desirable to be able to combine the function of momentary depressing of a push button to obtain a given speed control as well as being able to depress a button continuously for maintaining a selected speed control, and also to provide a timer for the motor control circuit which would automatically stop the motor after a push button is momentarily depressed, maintaining the speed desired for the period of time desired.

Accordingly, it is an object of this invention to provide a new and improved multiple mode variable speed motor control circuit which can be run at a predetermined speed by momentarily depressing a push button of the speed desired.

Another object of this invention is to provide a new and improved variable speed motor control circuit which may be operated at the desired speed when the push button representing that speed is continuously depressed.

Still another object of this invention is to provide a new and improved multiple mode variable speed motor control circuit which may be run at a selected speed for a predetermined time interval by the momentary actuation of a push button representing that speed.

A further object of this invention is to provide a new and improved multiple mode variable speed motor control circuit which is easy to operate, provides a plurality of operating speeds as well as a plurality of modes of operation, and which is relatively inexpensive.

SUMMARY OF THE INVENTION

In carrying out this invention in one illustrative embodiment thereof, a multi-mode master control switch applies power to the circuit which is rectified and applied across a resistance string having a plurality of push button switches connected thereto for selectively deriving a different control voltage therefrom in accordance with the push button switch selected. The common output of the push button switches is applied to a motor control circuit for controlling the operation of the motor. The master control switch in one position thereof couples to the motor control circuit a memory which continues to run the motor at the speed selected by the desired push button. After actuation, the selected push button may be released and the motor will continue to run at the selected speed. In another mode of the master switch, the memory is disengaged and the motor is run at the desired speed by selecting and continuously operating the push button for the speed selected. A timer circuit is optionally provided for running the motor at a predetermined speed in accordance with the push button selected and for a selected predetermined time, after which the memory is disabled and the operation of the motor discontinued.

BRIEF DESCRIPTION OF THE DRAWING

The drawing is a schematic diagram of the new and novel multiple mode variable speed motor control circuit embodied in this invention.

DESCRIPTION OF THE PREFERRED EMBODIMENTS

Referring now to the drawing, a source of AC potential is applied to the circuit at terminals 10 and 12. The power terminal 10 is connected to contacts 17 and 19 of a master control switch 15. The master control switch 15 provides a multiple mode operation for the circuit of this invention, having an OFF position with slider contacts 14 positioned as shown in the drawing. The slider 14 has two sliders both referred to with the reference character 14 which are mechanically connected but which electrically provide different connections which are hereinafter indicated. The master control switch has contacts 16 and 17, and 20 and 21, which are respectively interconnected by the slider contact 14 when the switch is in the ON position, and has contacts 18 and 19, and 22 and 23, which are respectively interconnected when the slider 14 of the master control switch 15 is in the PULSE position, as shown by the arrows on the drawing. Contacts 16, 18, and 22 are interconnected in the master control switch 15. Accordingly, when the master control switch is either in the ON or the PULSE positions, the slider 14 will connect power from terminal 10 to contacts 16 or 18, which are common, and in the center position the power will end at switch 15 and the control power will be off. A resister 24 is connected between contacts 21 and 23, and a capacitor 25 is coupled between contacts 20 and 22 with the negative side of the capacitor 25, indicated as point 45, being connected to the ground side of the entire circuit. The ground of the control circuit shown does not necessarily have to be the earth ground of the power system which is applied thereto.

When the master control switch 15 is either in the ON or in the PULSE position, power will pass from the terminal 10 through the master control switch 15, through a current-limiting resister 28 and a neon lamp 26 which in turn is connected to power terminal 12. The neon lamp 26 provides a power-on indicator. Since the neon bulb 26 and the resister 28 are connected to contact 22 and ground point 45, and since contact 22 is interconnected with contacts 16 and 18, the indicator lamp will be turned on when the master control switch 15 is either in the ON or in the PULSE position.

Terminal 12 of the power source is connected directly to one side of a motor 30 which is to be controlled, and to the other side of neon bulb 26. Power is also applied from terminal 12 to a diode 31 which rectifies the power to a pulsating DC current which in turn is dropped through a resistor 32 and applied through a resistance string 35. A capacitor 36 is connected across the resistance string 35 for filtering the DC current and providing a voltage of approximately 20 volts DC at point 34. The bottom resistor of the resistance string 35 is a variable resistor 38 which is utilized for adjusting the minimum motor speed desired. A plurality of push button switches 40 are connected along the resistance string 35 and all have a common output connected to point 42. The drawing shows 16 push buttons, which will provide 16 speeds. It will be appreciated, however, that the number of buttons provided will depend on the application, and even more speeds varying from very slow to very fast, for example 5000 rpm to 24000 rpm may be provided as desired. In the example chosen for purposes of illustration here, each of the push button switches coupled to the resistance string 35 (the first push button being coupled between points 34 and 42) will provide a voltage ranging from 20 VDC to a lower voltage determined by the selection of the resistors in the string 35, and adjusted by variable resistor 38 for setting the minimum motor speed desired.

The common output side of switches 40, being point 42, is connected to points 44 and 46, which is coupled to contact 21 of the master control switch 15. Point 42 is also connected to a motor control circuit 55 through a high value resistor 48 (10 megohms). The motor control circuit 55 includes the high beta transistor 50, a zener diode 54, and a silicon controlled rectifier (SCR) 60. A bypass capacitor 52 is connected between the base of transistor 50 and ground, and serves to bypass any AC noise that might cause erratic operation of the transistor 50. The output of transistor 50 is coupled to zener diode 54, which also has a capacitor 56 connected between the input thereof and ground, and a resistor 62 coupled to the motor 30. When the power from terminal 12 is positive, current will pass through the motor 30 through resistor 62 to charge capacitor 56 until it has reached a voltage less than the zener voltage of the zener diode 54 at the end of the positive half-cycle. The output of the zener diode is connected to the gate of the SCR 60 which is connected between the motor 30 and ground. When the zener voltage of zener diode 54 is exceeded, the SCR is turned on and power applied to the motor 30. The time in reaching the zener voltage and the turning on of the SCR 60 depends on the conduction of transistor 50 which is determined by the control voltage applied thereto in accordance with the push button selected. When transistor 50 is conducting, a charge is added to capacitor 56 causing the zener voltage of zener diode 54 to be exceeded some time before the end of each positive half-cycle of power which fires the zener diode 54 and turns on SCR 60, thus controlling the speed of operation of motor 30. The different firing times of the zener diode 54 is thus controlled by the control voltage at point 42 which is selected by one of the push buttons 40. During the negative half-cycle, it is necessary to discharge capacitor 56 in order to enable the circuit to operate again during the next positive half-cycle. This is accomplished by the negative current from terminal 12 passing through the motor 30 and through resistor 62 to the capacitor 56. This reverse current also resets SCR 60 for the next positive half-cycle of power.

The capacitor 25 functions as a memory means for the motor control circuit 55. Application of a voltage at point 42 by pushing the desired speed selection push button with the master control switch in the ON position applies a voltage which will turn on transistor 50 in accordance with the voltage applied. With the master control switch 15 in the ON position, contacts 20 and 21 are interconnected, thereby applying the voltage at point 42 to capacitor 25, thereby charging the capacitor 25 to that voltage. Upon removing the actuation of the desired speed selection push button 40, the stored charge of the capacitor 25 supplies the required current through point 42 and through resistor 48 to transistor 50 to keep it operating as if the desired push button were still being depressed. Thus, the capacitor 25 acts as a memory. The capacitor 25 should be selected for minimum self-leakage so that the leakage and drain results in a minimum and an allowable drop in motor speed over a desired period of time. In the present application, by way of illustration only, the capacitor may comprise a tantalum 20-microfarad 20-volt DC 5% type with a maximum leakage at 20 VDC of 0.5 microamperes. The transistor 50 is selected to provide a high beta with a current gain high enough so that the maximum current drain at 20 VDC of capacitor 25 is 0.6 microamperes. The use of the transistor 50 of a very high beta results in a very high input impedance, and thus a very low drain on the speed memory capacitor 25. The use of the high beta transistor in combination with the speed memory capacitor 25 is made possible by the fact that the control is functionally a direct current control rather than an AC control as far as all of the parts of the control leading up to and including the transistor 50 are concerned.

After a selected push button 40 has been activated and the motor is running at a selected speed, the activation of another push button 40 of higher or lower potential will charge or discharge the capacitor 25 to that new potential, and run the motor 30 at the newly selected speed. The provision of the capacitor 25 providing the memory function allows the push buttons 40 to be activated only momentarily, and then released to run the motor 30 at the selected speed for an extended period of time, limited only by the long-term leakage of capacitor 25.

As will be explained later, a timer circuit 65 may be incorporated for running the motor at a predetermined speed for a predetermined interval.

When the master control switch 15 is operated in the PULSE mode, the capacitor 25 is disconnected from point 42, thus removing the memory from the circuit. In this mode, contacts 22 and 23 are interconnected, which connects resistor 24 to point 42. Since contact 22, to which resistor 24 is connected, is coupled to ground, any leakage currents across the surfaces of the printed circuit board of which this circuit is assembled, or through the body of the board, which would have been absorbed by capacitor 25 when operating in the ON position of master control switch 15, will be bypassed to ground through resistor 25 and have no effect on the operation of the circuit. Otherwise, these currents would cause self-operation, which is an undesirable condition. In the PULSE mode, the desired speed is selected by activating a push button and continuing to hold it down for as long as the operation is to continue, which places a voltage on point 42 and thus to the motor control circuit 55. When the push button is released, the motor will stop.

Briefly, in summation of operation, a control voltage is applied to point 42 by the selection of a push button 40 of the desired speed, providing a selectable voltage at point 42, which controls the conduction of transistor 50, controlling the zener diode 54, which turns on SCR 60 to power the motor 30. The SCR 60 operates the motor 30 in a conventional phase-controlled manner. During negative half-cycles the SCR is reset by discharging capacitor 56, resetting the zener diode 54 to fire on the next positive half-cycle when the combination of the charge on 56, applied through the motor 30 and resistor 62, and the conduction of transistor 50 again exceeds the zener voltage to again fire the SCR. In the ON position of the master control switch 15 the push button 40 need be only momentarily depressed, since the memory capacitor 25 is placed in circuit in this mode. In operation in the PULSE mode, the selected push button must be continually activated to run the motor 30 for as long as the button is actuated.

A timer circuit 66 may be utilized if desired to turn off the motor 30 after a selected period of time. The timer circuit 66 includes a resistor 63 connected to the DC voltage at point 34, and to a variable arm 64 of a potentiometer 65 which also includes a switch 70. The potentiometer 65 is connected through a diode 68 to a capacitor 72 and a zener diode 74. The zener diode 74 is connected to the base of a transistor 75 whose collector is connected to point 44 and whose emitter is coupled through a resistor 76 to ground. The base of transistor 80 is coupled through a resistor 82 to the zener diode 74, and through its collector to the base of transistor 50. The emitter of transistor 80 is coupled to the emitter of transistor 75 and then through resistor 76 to ground. A resistor 78 is connected to the base of transistor 80 and ground for "clamping off" purposes.

In operation, the voltage from point 34 passes through resistor 63 to the arm 64 of potentiometer 65, and through diode 68 to ground if the switch 70, which is part of the potentiometer 65, is closed, which occurs when the potentiometer 65 is in a manual position. When the potentiometer 65 is set for 10 seconds, switch 70 opens, but the resistance of the potentiometer 65 is zero, so the only resistance to the charging of capacitor 72 is resistor 63. Capacitor 72 and resistor 63 are selected such that they combine to charge capacitor 72 to the zener voltage of zener diode 74 in 10 seconds. In addition, the potentiometer 65 is selected so that at full value the sum of its resistance and that of resistor 63 will require 60 seconds to charge capacitor 72 to the same zener diode voltage. By this process, a timing of from 10 to 60 seconds may be provided. When the zener voltage of zener diode 74 is reached, the zener diode 74 conducts, which turns on transistor 75. With the master control switch 15 in the ON position, the conduction of transistor 75 discharges the capacitor 25, which is the memory of this system, through the transistor 75 and resistor 76, to ground. The motor control circuit would thus lose its memory and shut down. However, since the actuation of another speed selection push button 40 would result in recording another memory for a short period, currents passing through the zener diode 74 are also passed through resistor 82 to transistor 80, which will take any currents at the base of transistor 50 and ground them through resistor 76 as well. Resistor 78 clamps transistor 80 off in the event there is no time out, and no currents through zener diode 74. Resistor 82 limits the current available to switch transistor 80 so that enough current will remain to operate transistor 75. Diode 68 allows forward current to operate the timer circuit 66 by charging capacitor 72. If the timer circuit 66 should time out and stop the motor 30 and the master control switch 15 is turned off but the timer control potentiometer 65 is not set back to Manual, the charge of capacitor 72 cannot leak back through the diode 68 into the balance of the control, and the charge will remain, requiring a manual reset of the timer potentiometer 65 in another operation, to prevent a short time-out in such other operation.

A multiple mode, variable speed motor control circuit is thus provided which offers the features in one mode of momentary actuation for running a motor at a predetermined speed. With the addition of a timer circuit, that speed can be controlled for a predetermined period of time. In another mode, the selected speed may be maintained by continuously depressing the push button for the desired speed. The use of a DC control voltage allows the use of inexpensive components, such as a very high beta transistor having a very high input impedance, which provides a very low drain on the speed memory. If an AC type control system were utilized, high cost components would be required. An easy-to-operate and inexpensive variable speed motor control circuit is thus provided for controlling the speed of a motor that may have as many as 15 or even more speeds varying from very slow to very fast, and which may control the motor operation with respect to time. This type of circuit has general application to mixers, blenders, and other devices where a multitude of speeds and their control is desired.

Since other modifications and changes, varied to fit particular operating requirements and environments, will be apparent to those skilled in the art, the invention is not considered limited to the examples chosen for purposes of disclosure, and covers all modifications and changes which do not constitute departures from the true spirit and scope of this invention.

I claim:

1. A variable speed motor control circuit adapted to be actuated momentarily by push buttons for running the motor at a predetermined speed after the selected push button is released, comprising
   a. a source of potential,
   b. a master control switch coupled to said source of potential,
   c. a plurality of serially connected resistors adapted to be coupled to said source of potential by said master control switch for providing a control voltage thereon,
   d. a plurality of push button switches capable of being momentarily operated, selectively coupled to said resistors and having a common output for providing thereat a different control voltage in accordance with the push button selected,
   e. a motor,
   f. a motor control circuit having an imput coupled to said common output of said push button switches and an output coupled to said motor for controlling the speed of said motor in accordance with the push button depressed, g. said motor control circuit having a high betaa transistor, a zener diode and a silicon controlled rectifier, said high beta transistor having an input thereof coupled to said common output of said push button switches and an output coupled to said zener diode, said silicon controlled rectifier coupled to said zener diode and to said motor whereby said motor speed is controlled by the controlled voltage applied to said transistor which controls said zener diode for switching said silicon controlled rectifier to apply power to said motor, and h. memory means coupled to the input of said motor control circuit for providing a predetermined control voltage to said motor control circuit in accordance with the push button selected thereby requiring only a momentary activation of the push button selected.

2. The structure set forth in claim 1 wherein said master control switch has an on position which couples said memory means to the input of said motor control circuit and a pulse position in which said memory means is disconnected from said motor control circuit and the operation of said motor requires the continuing activation of the push button selected to run said motor at a predetermined speed.

3. The structure set forth in claim 1 wherein said memory means comprises a capacitor which changes to a control voltage in accordance with the push button selected.

4. The structure set forth in claim 1 including a diode connected to said source of potential and to said plurality of serially connected resistors for providing essentially a direct current control voltage at said common output of said push button switches when one of said push button switches is activated.

5. The structure set forth in claim 1 including a timer control circuit coupled to said motor control circuit for controlling the length of time said motor is run at a predetermined speed before said motor is turned off.

6. The structure set forth in claim 5 wherein said timer control circuit includes means for disabling said memory means after a settable predetermined time for disabling said motor control circuit.

* * * * *